(12) United States Patent
Bychkov

(10) Patent No.: US 9,083,846 B2
(45) Date of Patent: *Jul. 14, 2015

(54) DECENTRALIZED SYSTEM AND METHOD FOR VOICE AND VIDEO SESSIONS

(71) Applicant: Google Inc., Mountain View, CA (US)

(72) Inventor: Eyal Bychkov, Hod Hasharon, IL (US)

(73) Assignee: Google Inc., Mountain View, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 13/895,396

(22) Filed: May 16, 2013

(65) Prior Publication Data

US 2013/0258038 A1    Oct. 3, 2013

Related U.S. Application Data

(63) Continuation of application No. 13/101,358, filed on May 5, 2011, now Pat. No. 8,457,118.

(60) Provisional application No. 61/345,318, filed on May 17, 2010.

(51) Int. Cl.

| | |
|---|---|
| H04N 7/14 | (2006.01) |
| H04M 1/253 | (2006.01) |
| H04W 4/20 | (2009.01) |
| H04M 1/725 | (2006.01) |
| H04W 84/18 | (2009.01) |

(52) U.S. Cl.

CPC ............ *H04N 7/147* (2013.01); *H04M 1/2535* (2013.01); *H04N 7/148* (2013.01); *H04W 4/20* (2013.01); *H04W 4/206* (2013.01); *H04M 1/7253* (2013.01); *H04W 84/18* (2013.01)

(58) Field of Classification Search
USPC ................................ 348/14.02; 370/354, 389
See application file for complete search history.

(56) References Cited

U.S. PATENT DOCUMENTS

| | | | |
|---|---|---|---|
| 6,834,192 B1 | 12/2004 | Watanabe et al. | |
| 7,020,704 B1 | 3/2006 | Lipscomb et al. | |
| 2001/0055951 A1* | 12/2001 | Slotznick | 455/41 |
| 2003/0107529 A1* | 6/2003 | Hayhurst et al. | 345/1.1 |
| 2006/0075439 A1* | 4/2006 | Vance | 725/81 |
| 2008/0212649 A1 | 9/2008 | Jougit | |
| 2009/0010485 A1* | 1/2009 | Lamb et al. | 382/100 |

* cited by examiner

*Primary Examiner* — Joseph J Nguyen

(74) *Attorney, Agent, or Firm* — Soquel Group LLC

(57) ABSTRACT

A method for audio and video communication, comprising establishing, by a telephony service, a first voice over IP (VoIP) session with a handset, establishing, by the telephony service, a second VoIP session with a display device that is wirelessly but not physically connected to the handset, separating, by the telephony service, an audio portion of a communication session from a video portion of the communication session, transmitting, by the telephony service, the separated audio portion to the handset using the first VoIP connection, and transmitting, by the telephony service, the separated video portion to the display device using the second VoIP connection.

11 Claims, 5 Drawing Sheets

DECENTRALIZED SYSTEM AND METHOD FOR VOICE AND VIDEO SESSIONS

CROSS REFERENCES TO RELATED APPLICATIONS

This application is a continuation of U.S. Ser. No. 13/101,358, now U.S. Pat. No. 8,457,118, entitled DECENTRALIZED SYSTEM AND METHOD FOR VOICE AND VIDEO SESSIONS, filed on May 5, 2011 by inventor Eyal Bychkov. U.S. Ser. No. 13/101,358 is a non-provisional of U.S. Provisional Application No. 61/345,318, entitled DECENTRALIZED SYSTEM AND METHOD FOR VOICE AND VIDEO SESSIONS, filed on May 17, 2010 by inventor Eyal Bychkov.

FIELD OF THE INVENTION

The present invention is directed to Voice and Video conversations Over IP, and more particularly to a method and system for making such communications using a decentralized architecture.

BACKGROUND OF THE INVENTION

There are numerous devices and applications which are based on transferring Voice and/or Video over IP (Internet Protocol). These include having VOIP clients on a PC, or installed on any other communication device, such as a mobile phone. There are also dedicated Wi-Fi telephones which support VOIP applications; VOIP telephones can be both wired, such as the Cisco CP-7941G, or wireless, such as the Polycom SPECTRALINK® 8002 2200-37010-020 or Linksys WIP310-G1.

Client devices for making and receiving voice and video calls over the IP network with the standard functionality of most "original" telephones are also referred to as "softphones". Softphones usually allow integration with IP phones and USB phones instead of utilizing a computer's microphone and speakers (or headset). Often a softphone is designed to behave like a traditional telephone, sometimes appearing as an image of a phone, with a display panel and buttons with which the user can interact.

A typical application of a softphone is to make calls via an Internet telephony service provider to other softphones or to telephones. Popular Internet telephony service providers include SKYPE®, GOOGLE TALK™, and VONAGE®, which have their own softphones that a user may install on his computer or the like. Most service providers use a communication protocol called SIP (Session Initiation Protocol), whereas SKYPE® has a closed proprietary system. In order to make a voice call over the internet, one should have any computing device with an audio input (e.g. microphone) and output means (e.g. a speaker or headset), Internet connectivity such as DSL, Wi-Fi, cable or LAN, and an account with an Internet telephony service provider or IP PBX.

Such prior art devices establish a single connection to the Internet telephony service provider.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate generally to Voice and Video over IP. In particular, aspects of the present invention relate to a system and method for communication where there is more than one terminal for conducting and controlling the VoIP sessions.

Figure 1:
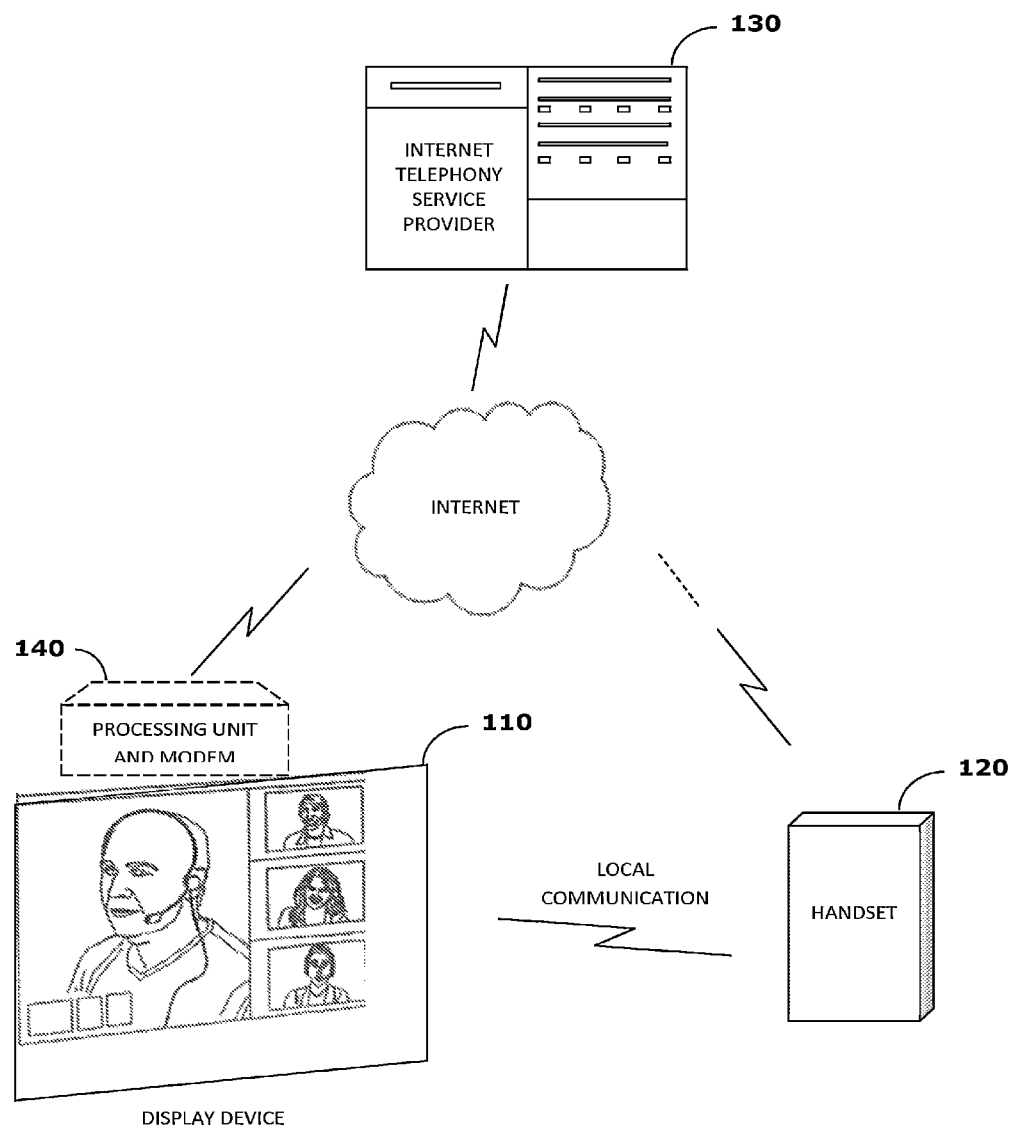
FIG. 1 is a simplified block diagram of the VOIP system, in accordance with an embodiment of the present invention.

Reference is now made to FIG. 1, which is a simplified block diagram of the system according to an embodiment of the present invention. The system includes a display 110 (referred to hereinafter as the Display) and a handset 120 (referred to hereinafter as the Handset). The Display may be inter alia a PC display, an LCD screen, a Plasma Display Panel, an LED panel, a Digital Picture Frame (DPF) device and any other display or device having a display. The Handset is typically a mobile electronic device, which communicates with the Display via local communication means. The local communication may be inter alia BLUETOOTH®, Infra-Red (IR), Wi-Fi or any other Near Field Communication means. Both Display 110 and Handset 120 are capable of communicating with Internet Telephony Service Provider 130 via the internet. Display 110 may include a modem and processing means (such as a PC or laptop computer which includes both the display and the CPU and modem) or may be connected to a separate processing unit and modem 140. Display 110 may also include or be connected to a processing unit which in turn is connected wirelessly to a router and a modem, for connecting to the internet. Handset 120 may be connected wirelessly to a router which is connected to the internet, or may be connected to the internet via any network (3G, GPRS, etc.) using any known in the art standard (e.g. WAP). According to another embodiment of the present invention, Handset 120 may even be connected to the internet via local connection to Display 110, which is connected to the internet in any of a few ways, as described hereinabove.

According to an embodiment of the present invention, a softphone application is installed and operates on both Display 110 and Handset 120, which are synced so as to provide a seamless experience to the user. A typical scenario includes a user having the Handset 120 close to him, possibly in his hands, whereas Display 110 is a few meters away, such as when Display 110 is an LCD display in the living room. Therefore such a scenario or similar scenarios would benefit from a decentralized system and method for providing Voice over IP or Voice and Video over IP sessions. According to an embodiment of the present invention, the controlling of such VoIP sessions is done from Handset 120; e.g. initiating calls to contacts, answering calls, ending calls, etc.

According to an embodiment of the present invention, both Display 110 and Handset 120 have audio and video capabilities, as shown in Table 1 below. Display 110 includes audio input means (e.g. built-in microphone, or such that is connected to the processing unit and modem 140), audio output (speakers), video input (built-in camera or such that is connected to the processing unit and modem 140) and video output (the display). Handset 120 includes audio input means (microphone), audio output means (earpiece and/or speakers and or headsets), and video output means (display) and according to an embodiment of the present invention may also include video input means (built-in or attachable camera).

TABLE 1

|  | Display 110 | Handset 120 |
| --- | --- | --- |
| Audio input | Built-in microphone or microphone attached to processing unit and modem 140 | Built-in microphone |
| Audio output | Speakers | earpiece and/or speakers and or headsets |
| Video input | Built-in camera or attached to processing unit and modem 140 | Built-in or attachable camera |
| Video output | Display | Display |

Figure 2:
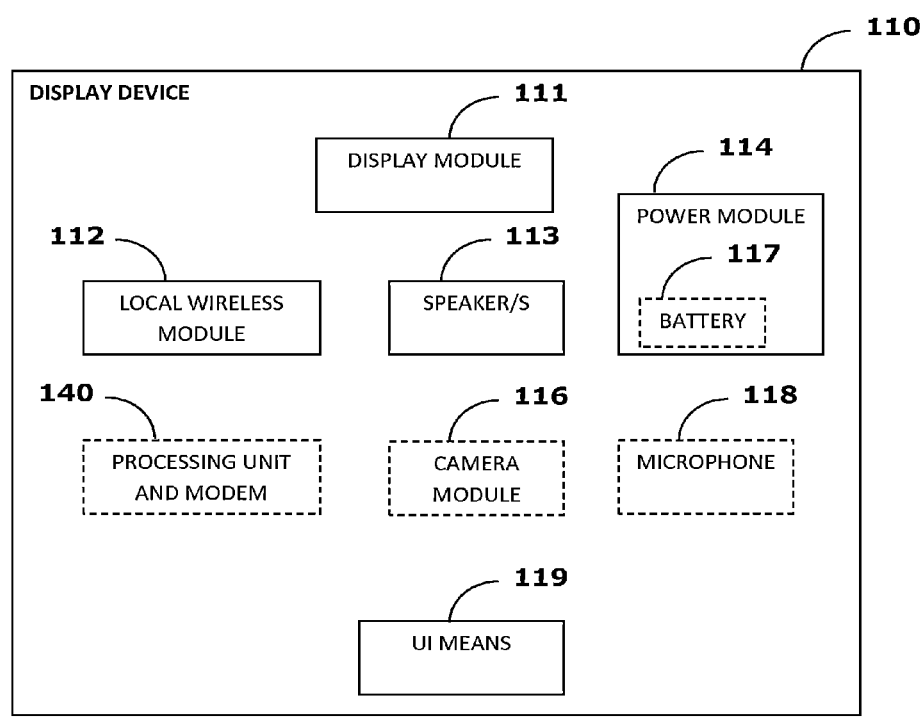
FIG. 2 is a simplified block diagram of the Display, in accordance with an embodiment of the present invention.

Reference is now made to FIG. 2, which is a simplified block diagram of Display 110, according to an embodiment of the present invention. Display 110 includes display module 111, which includes any display technology, such as LCD, Plasma, LED, OLED, Bi-Stable or any other. for example, for an LCD module, display module 111 typically includes LCD Controller, LCD driver and LCD glass. Display 110 also includes local wireless module 112 for communicating with Handset 120. Display 110 further includes speaker or speakers 113 and power module 114, which may consist of a power outlet and/or optionally battery 117. Display 110 optionally includes processing unit and modem 140, which may alternatively be connected externally to Display 110. Display 110 optionally includes camera module 116, which functions as video input to Display 110. Display 110 may optionally also include a microphone 118, which serves as audio input. Microphone may also be an external component. Display 110 also includes UI (user-interface) means 119 for operating Display 110. UI means 119 may be keypad, button/s, touchscreen, or any other UI method known in the art.

Figure 3:
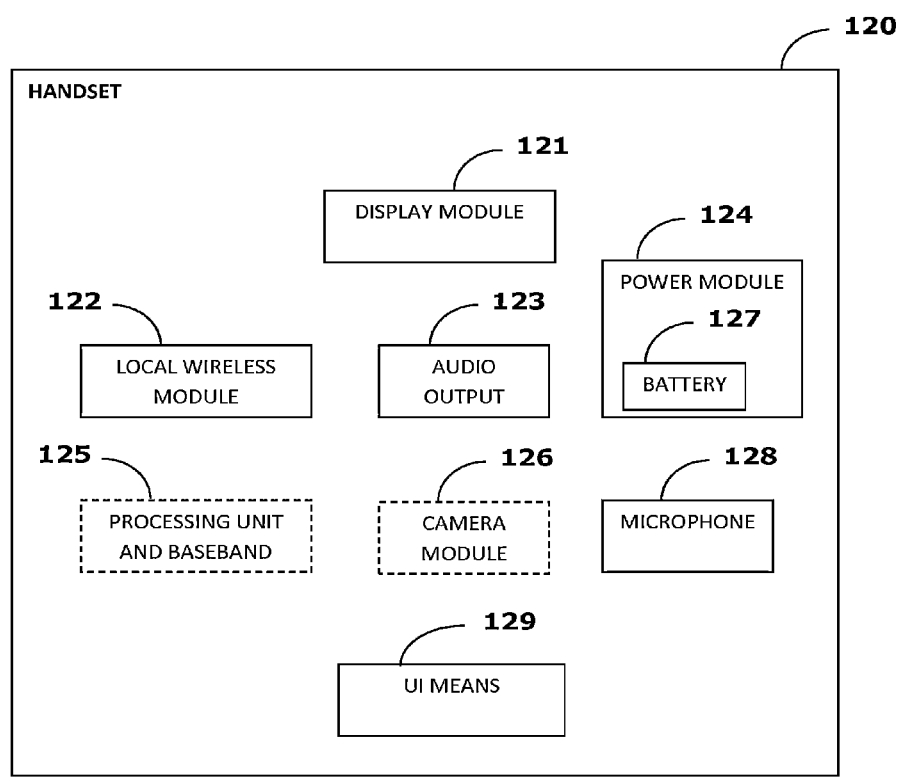
FIG. 3 is a simplified block diagram of the Handset, in accordance with an embodiment of the present invention.

Reference is now made to FIG. 3, which is a simplified block diagram of Handset 120, according to an embodiment of the present invention. Handset 120 includes display module 121, which includes any display technology used for small mobile devices, such as LCD, LED, OLED, Bi-Stable or any other. Handset 120 also includes local wireless module 122 for communicating with Display 110. Said module 122 may be Bluetooth, IR, Wi-Fi, NFC or any wireless module. Handset 120 further includes AUDIO OUTPUT MEANS 123, which may include earpiece and/or speakers and or headsets. Handset 120 also includes power module 124, which typically consists of a power outlet and battery 127. Handset 120 optionally includes processing unit and baseband 125, in which case Handset 120 serves as a mobile communication device, such as a mobile cellular phone. If Handset 120 is a mobile cellular phone, it may include further components known in the art, such as Antenna. Handset 120 optionally includes camera module 126, which functions as video input to Handset 120. Handset 120 also includes a microphone 128, which serves as audio input. Handset 120 also includes UI (user-interface) means 129 for operating Handset 120. UI means 129 may be keypad, button/s, touchscreen, or any other UI method known in the art.

According to a preferred embodiment of the present invention, since Handset 120 is typically in great vicinity to the user, it is used as the audio input of a conversation. The audio out may be either the audio output means of Display 110 or that of Handset 120; video output is preferably the display of Display 110, and video input may be either video input means of Display 110 or Handset 120.

According to another embodiment of the present invention, audio and video input and output means may be used concurrently. E.g., both audio output of Display 110 and that of Handset 120 may play the audio of the active conversation.

Figure 4:
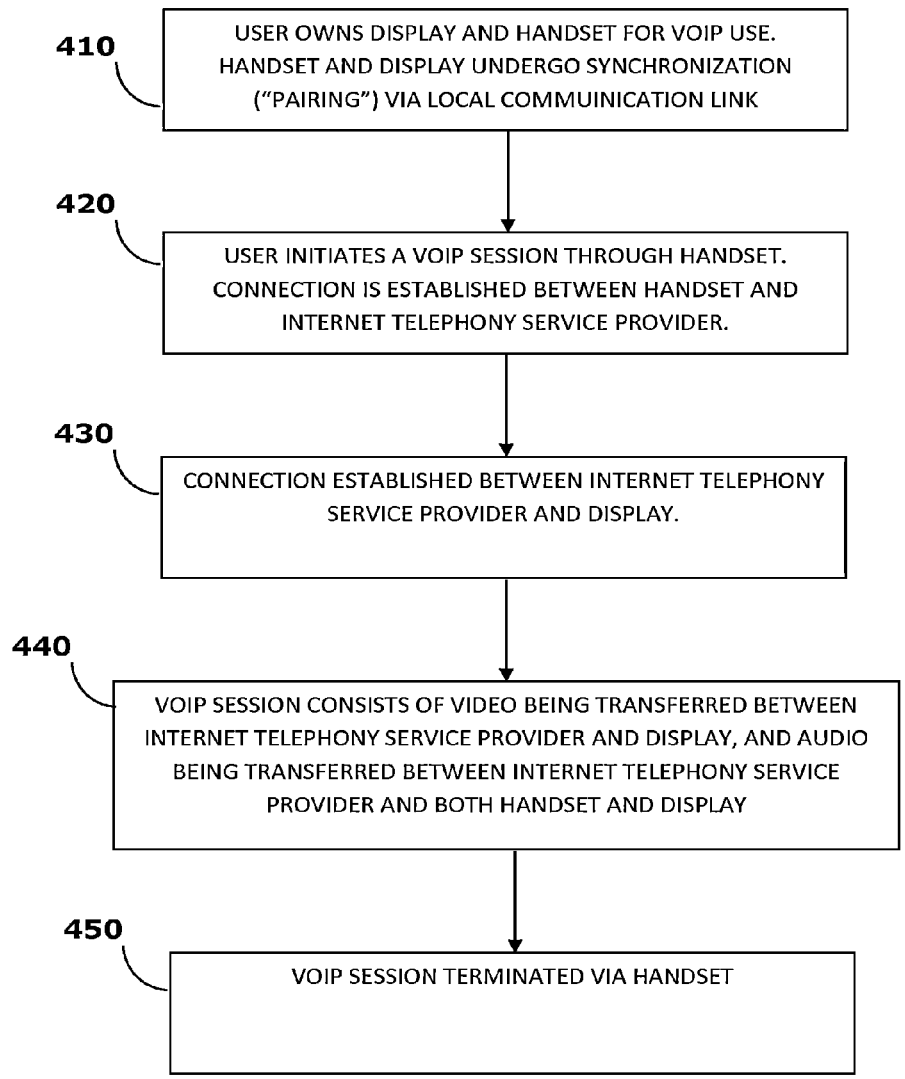
FIG. 4 is a simplified flowchart of a method for conducting a VOIP conversation, in accordance with an embodiment of the present invention.

Reference is now made to FIG. 4, which is a simplified flowchart of a method for conducting a VOIP conversation, in accordance with an embodiment of the present invention. At step 410, Display 110 and Handset 120 of user are in close proximity and are paired. Such pairing may be pairing procedure known in the art, for example Bluetooth pairing. In addition, said pairing may be initiated manually by user, via Handset 120. At step 420, user initiates a VoIP session through Handset 120, which is typically carried by hand. VoIP session may be, for example, a video call. Handset 110 connects to internet telephony service provider 130, to perform the conversation.

Step 430 occurs concurrently or immediately follows step 420. At step 430, a second connection is established between internet telephony service provider 130 and Display 110. According to an embodiment of present invention, said second connection is initiated by Display 110, which contacts internet telephony service provider 130 and signal that it should join initiated or ongoing session between internet telephony service provider 130 and Handset 110. Display 110 may transfer any detail about Handset and/or session so that internet telephony service provider 130 identifies session and can transfer the session or parts of it (e.g. video) to Display 110. According to another embodiment of the present invention, Handset 120 signals to Internet telephony service provider 130 that it is paired to Display 120, and therefore the initiated VoIP session should be shared with Display 110.

Said second connection between Display 110 and Internet telephony service provider 130 is typically established for video purposes, whereas according to an embodiment of the present invention, video of said VoIP session is transferred between internet telephony service provider 130 and Display 110, and audio is transferred between internet telephony service provider 130 and both Handset 120 and Display 110.

Display 110 typically has a larger display than Handset 120, more convenient for user viewing, and possibly better speakers, and in addition connection between Display 110 and internet telephony service provider 130 is of higher band width, as compared to connection between Handset 120 and internet telephony service provider 130. Therefore, at step 440, the video part of the VoIP session, which is more bandwidth consuming, is transferred between Display 110 and internet telephony service provider 130, and the audio part is transferred between internet telephony service provider 130 and both Display 110 and Handset 120. Handset 110 is especially used for audio input of the VoIP session, whereas the audio output may be played through audio output means of Handset 110, Display 120, or both. At step 450, user terminates VoIP session via Handset 120.

According to an aspect of the current invention, even though the VoIP session is divided between two connections, the session is seamless and the user carries out the conversation as if it were a single connection. Accordingly, there is synchronization between Display 110 and Handset 120. Said synchronization is used in diminishing latencies between audio and video, and between Display 110 and Handset 120. The video received and displayed on Display 110 is synchronized with the audio received and played on either speaker/s 113 of Display 110 or audio output means 123 of Handset 120. Synchronization between Display 110 and Handset 120 is performed either via internet telephony service provider 130 or directly. In a first embodiment of the present invention, a time stamp is sent from both Display 110 and Handset 120 to internet telephony service provider 130. The internet telephony service provider 130 in turn alters transmission time of data, audio and/or video, to Display 110 and Handset 120. According to a second embodiment of the present invention, Display 110 and Handset 120 may have buffers which allow them to synchronize between Display 110 and Handset 120, by delaying playing/sending of data to internet telephony service provider 130.

According to an embodiment of the present invention, Handset 120 is also used to control other elements in Display 110, using local communication channel, which is established by local wireless modules 112 and 122. For example, Handset 120 may act as a remote control to Display 110.

According to yet another embodiment of the present invention, the system includes multiple Displays, similar to Display 110. Handset 120 communicates with all Displays, and may control a session which is divided between Handset 120 and a first Display 120 and upon manual selection by the user, or automatically, session may be handed-over to be divided between Handset 120 and second Display 110. Hand-over between first Display 110 and second Display 110 is initiated manually by user, who may be able to see which other Displays are in his vicinity. In another embodiment of the present invention, the session may be handed over automatically, possibly when user moves from first location to second location, and/or when local communication between Handset 120 and said second Display 110 is typically of better quality than that between Handset 120 and said first Display 110. Such handover mechanisms are described in the art, for example, U.S. Pat. No. 6,834,192 to Watanabe et al., which describes handover of communications in a Bluetooth, or other, radio communication system, or U.S. patent application Ser. No. 11/680,911 to Jougit, describing a method and system for a distributed Bluetooth host architecture.

Figure 5:
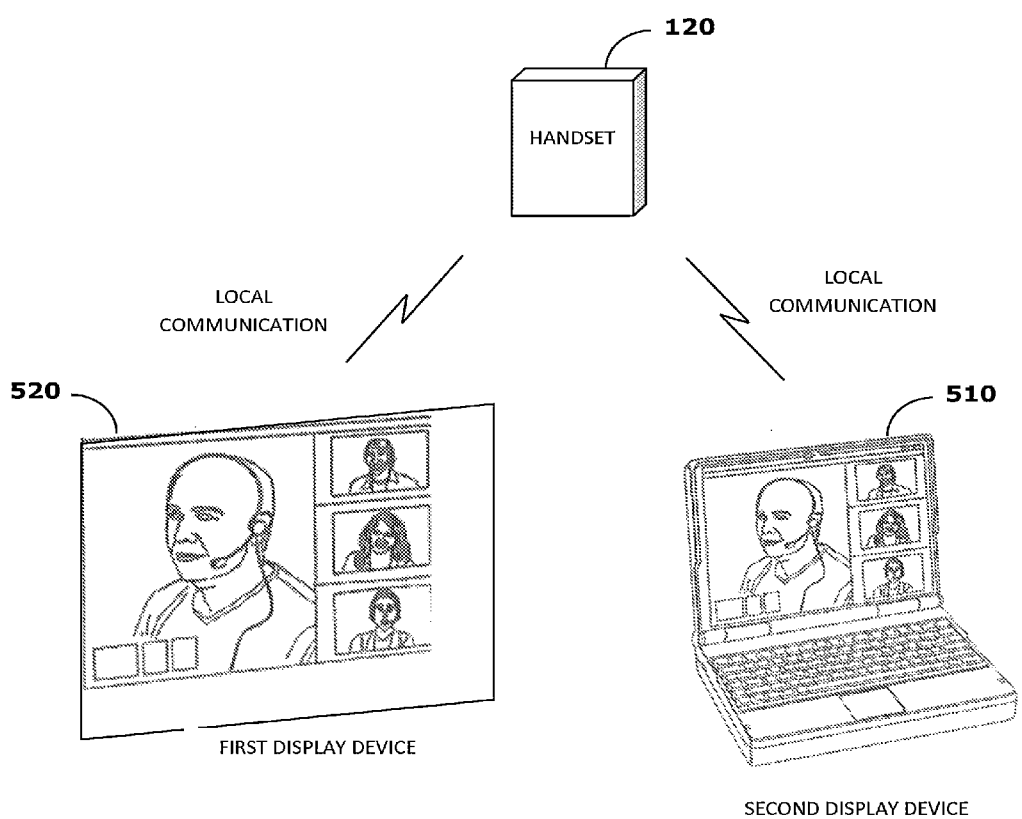
FIG. 5 is a simplified block diagram of the VOIP system, in accordance with an embodiment of the present invention.

Reference is now made to FIG. 5, which is a simplified block diagram of the system according to an embodiment of the present invention. Handset 120 may be paired with first Display 510 or second Display 520, which may be any Display 110, as described above.

What is claimed is:

1. A method for audio and video communication, comprising:
   receiving, by a telephony service from a handset, a request to initiate or to answer a voice over IP (VoIP) phone call;
   establishing, by the telephony service in response to said receiving, a first voice over VoIP session with the handset;
   initiating, by the telephony service, a communication session with the handset;
   establishing, by the telephony service, a second VoIP session with a display device that is wirelessly but not physically connected to the handset;
   sharing, by the telephony service, the communication session with the display device;
   separating, by the telephony service, an audio portion of the communication session from a video portion of the communication session;
   transmitting, by the telephony service, the separated audio portion to the handset using the first VoIP connection;
   transmitting, by the telephony service, the separated video portion to the display device using the second VoIP connection; and
   synchronizing, by the telephony service, said transmitting of the audio portion with said transmitting of the video portion, based on time stamps received by the telephony service from each of the handset and the display device.

2. The method of claim 1 further comprising receiving, by the telephony service from the display device, a request to join the communication session, and wherein said establishing the second VoIP session and said sharing the communication session with the display device are performed in response to said receiving the request to join.

3. The method of claim 1 further comprising receiving, by the telephony service from the handset, a request to share the communication session with the display device, and wherein said establishing the second VoIP session and said sharing the communication session with the display device are performed in response to said receiving the request to share.

4. The method of claim 1 further comprising transmitting, by the telephony service, the audio portion of the communication session to the display device using the second VoIP connection.

5. The method of claim 1 further comprising transmitting, by the telephony service, the video portion of the communication session to the handset using the first VoIP connection.

6. The method of claim 1 further comprising synchronizing, by the display device via wireless communication with the handset, displaying of the video portion with playing of the audio portion by the handset.

7. The method of claim 1 further comprising synchronizing, by the handset via wireless communication with the display device, playing of the audio portion with displaying of the video portion by the display device.

8. The method of claim 1 further comprising:
   establishing, by the telephony service, a third VoIP session with a second display device that is wirelessly but not physically connected to the handset; and
   transmitting, by the telephony service, the video portion of the communication session to the second display device using the third VOIP connection.

9. The method of claim 8 further comprising recognizing, by the telephony service, that the wireless communication between the handset and the second display device is of better quality than the wireless communication between the handset and the display device, and wherein said establishing the third VoIP session is performed in response to said recognizing.

10. The method of claim 8 further comprising receiving, by the telephony service from the handset, a request to share the communication session with the second display device, and wherein said establishing the third VoIP session is performed in response to said receiving the request to share.

11. The method of claim 8 further comprising receiving, by the telephony service from the handset, a request to switch the communication session from the display device to the second display device, and wherein said establishing the third VoIP session is performed in response to said receiving the request to switch.

* * * * *

UNITED STATES PATENT AND TRADEMARK OFFICE
CERTIFICATE OF CORRECTION

PATENT NO. : 9,083,846 B2  
APPLICATION NO. : 13/895396  
DATED : July 14, 2015  
INVENTOR(S) : Eyal Bychkov Page 1 of 1

It is certified that error appears in the above-identified patent and that said Letters Patent is hereby corrected as shown below:

IN THE CLAIMS

Column 5, line 46, please replace "a first voice over VoIP session" with -- a first VoIP session --.

Signed and Sealed this  
First Day of March, 2016

Michelle K. Lee  
*Director of the United States Patent and Trademark Office*